United States Patent
Foerster et al.

(10) Patent No.: US 6,627,257 B1
(45) Date of Patent: Sep. 30, 2003

(54) PROCESS FOR COATING THE FLOW CHANNELS IN A MONOLITHIC CATALYST CARRIER WITH A COATING DISPERSION

(75) Inventors: Martin Foerster, Büdingen (DE); Josef Piroth, Mespelbrunn (DE); Ulrich Schlachter, Franfurt (DE); Rainer Domesle, Alzenau-Kälberau (DE); Willi Krampe, Mühlheim/Main (DE)

(73) Assignee: Degussa-Huls Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/377,157

(22) Filed: Aug. 19, 1999

(30) Foreign Application Priority Data

Aug. 20, 1998 (DE) .......................................... 198 37 731

(51) Int. Cl.[7] .................................................. B05D 3/12
(52) U.S. Cl. ........................ 427/235; 427/238; 427/294; 427/430.1; 427/443.2
(58) Field of Search ............................ 118/50; 427/239, 427/235, 238, 294, 295, 430.1, 443.2

(56) References Cited

U.S. PATENT DOCUMENTS

| | | | |
|---|---|---|---|
| 3,894,965 A | * 7/1975 | Foster et al. ................. 252/460 |
| 3,948,213 A | 4/1976 | Hoyer et al. ................... 118/50 |
| 4,208,454 A | 6/1980 | Reed et al. ................... 427/238 |
| 4,550,034 A | * 10/1985 | Shimrock et al. ............ 427/243 |
| 4,609,563 A | * 9/1986 | Shimrock et al. ............... 427/8 |
| 5,070,893 A | 12/1991 | Dittrich et al. ........... 134/104.4 |
| 5,165,970 A | 11/1992 | Schmidt et al. ........... 427/430.1 |
| 5,182,140 A | 1/1993 | Watanabe et al. ........... 427/230 |
| 5,346,722 A | * 9/1994 | Beauseigneur et al. ...... 427/300 |
| 5,866,210 A | * 2/1999 | Rosynsky et al. ........... 427/294 |
| 5,953,832 A | * 9/1999 | Rosynsky et al. ............. 34/403 |
| 5,998,328 A | * 12/1999 | Dawes et al. ................ 502/180 |
| 6,139,808 A | * 10/2000 | Mizuno et al. .............. 422/171 |
| 6,149,973 A | * 11/2000 | Foerster et al. .............. 427/235 |
| 6,180,075 B1 | * 1/2001 | Lindner et al. ........... 423/213.2 |

FOREIGN PATENT DOCUMENTS

| | | |
|---|---|---|
| GB | 1515733 | 6/1978 |
| JP | 59193140 | 11/1984 |
| WO | 9748500 | 12/1997 |

* cited by examiner

*Primary Examiner*—Shrive P. Beck
*Assistant Examiner*—Kirsten Crockford Jolley
(74) *Attorney, Agent, or Firm*—Kalow & Springut LLP

(57) ABSTRACT

A process for coating the flow channels in a monolithic, cylindrically shaped catalyst carrier with a coating dispersion, wherein the carrier has two end faces which are connected to each other by flow channels arranged parallel to the axis of the cylinder, by vertically aligning the axis of the cylindrical carrier, placing a predetermined amount of coating dispersion from a storage container on the upper end face of the carrier and drawing the dispersion through the flow channels under suction, removing excess coating dispersion from the flow channels by emptying the flow channels under suction, returning the excess dispersion to the storage container and fixing the dispersion coating by calcination. The coating dispersion is drawn through the flow channels under suction at a rate of flow of 0.1 to 1 m/s and after completion of passage under suction the excess coating dispersion is removed from the flow channels by applying a suction impulse from below, wherein the suction air is drawn through the flow channels under suction at a rate of flow between 40 and 1 m/s and the excess coating dispersion discharged with the air stream is separated from the air stream within a time of less than 100 ms after discharge from the catalyst carrier.

19 Claims, 2 Drawing Sheets

Figure 1:
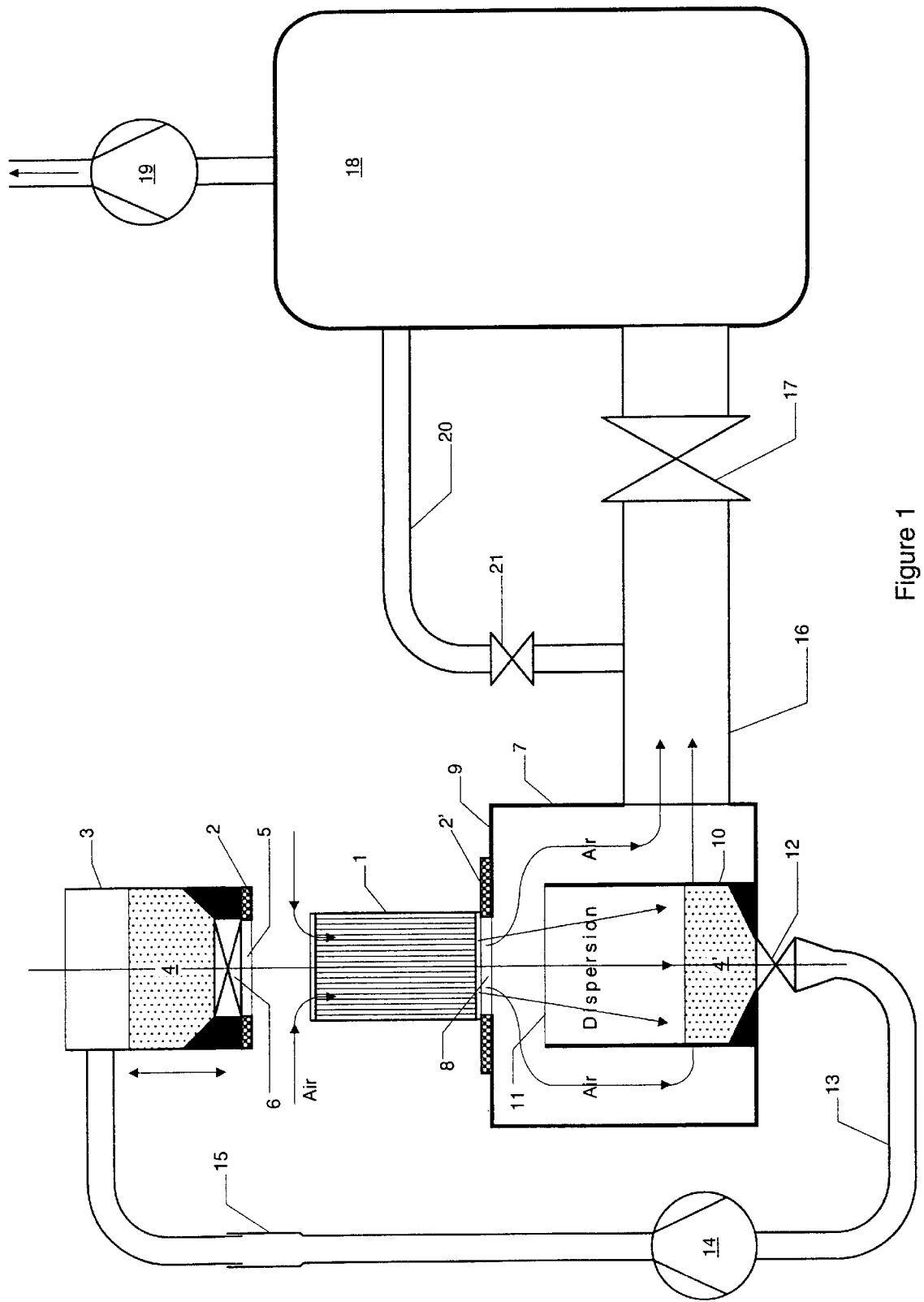

PROCESS FOR COATING THE FLOW CHANNELS IN A MONOLITHIC CATALYST CARRIER WITH A COATING DISPERSION

INTRODUCTION AND BACKGROUND

The present invention relates to a process for coating the flow channels in a monolithic, cylindrical catalyst carrier with a coating dispersion.

Monolithic, catalyst carriers are used on a large scale for the production of automotive vehicle exhaust gas catalysts used for pollution abatement. They have a cylindrical shape and a large number of flow channels for the exhaust gases from the internal combustion engine passes through them, the channels lying parallel to the axis of the cylinder. These carriers are frequently also called honeycomb carriers.

The cross-sectional shape of the catalyst carrier depends on how and where it is to be physically incorporated into the vehicle. Catalyst carriers with a round cross-section, an elliptical or triangular cross-section are widely used. The flow channels generally have a square cross section and are arranged in a tight grid over the entire cross-section of the catalyst carrier. Depending on the actual application, the channel density, or cell density, of the flow channels is between 10 and 120 $cm^{-2}$. Catalyst carriers with cell densities of up to 250 $cm^{-2}$ or more are under development.

For the purification treatment of vehicle exhaust gases, catalyst carriers which have been obtained by the extrusion of ceramic materials are used. As an alternative, catalyst carriers made from corrugated and rolled-up metal foils are available. Currently, catalyst carriers with cell densities of 62 $cm^{-2}$ are still mainly used for exhaust gas treatment in private cars. The cross-sectional dimensions of the flow channels in this case are 1.27×1.27 $mm^2$. The wall thicknesses in these kinds of catalyst carriers are between 0.1 and 0.2 mm.

In order to convert the harmful substances present in automotive vehicle exhaust gases, such as carbon monoxide, hydrocarbons and nitrogen oxides, into harmless compounds very finely divided platinum group metals are generally used, the catalytic effect of which can be modified by compounds of base metals. These catalytically active components have to be deposited onto the catalyst carrier. However, it is difficult to ensure the requisite very fine distribution of.catalytically active components by depositing these components onto the geometric surfaces of the catalyst carrier. This applies equally to both non-porous metallic and porous ceramic catalyst carriers. A sufficiently large surface area for the catalytically active components can only be provided by applying a support layer consisting of finely divided, high surface area materials.

The present invention provides a process for applying this type of support layer to the internal surfaces of the flow channels of honeycomb-shaped catalyst carriers. In the context of this invention, the support layer for the catalytically active components is called a dispersion coating. The dispersion coating consists of finely divided, high surface area materials and is produced using a so-called coating dispersion. The coating dispersion is a slurry of the finely divided materials, generally in water.

Various processes for depositing the coating dispersion on the catalyst carriers are known from the prior art. After the coating procedure, the catalyst carriers are dried and then calcined in order to consolidate the dispersion coating. The catalytically active components are introduced into the dispersion coating by impregnating with, generally, aqueous solutions of precursor compounds of the catalytically active components. As an alternative, the catalytically active components may be added to the coating dispersion itself. Subsequent impregnation of the final dispersion coating with catalytically active components is not required in this case.

GB 1 515 733 describes a coating process for ceramic catalyst carriers. The porous catalyst carriers are inserted upright, that is with the flow channels in a vertical alignment, into a pressure-resistant coating chamber and degassed by applying a reduced pressure of 0.84 bar (25 inches of mercury). Then the coating chamber is filled with coating dispersion to above the upper end face of the catalyst carrier and this is forced into the pores of the catalyst carrier by applying a pressure which is greater than atmospheric. After reducing the pressure back to atmospheric and opening a discharge valve in the base of the coating chamber, excess coating dispersion flows out of the flow channels in the catalyst carrier. Then any flow channels which are blocked with coating dispersion are blown clear from top to bottom using compressed air. The cycle time for this coating process is from less than 1.5 to 2 minutes.

U.S. Pat. No. 4,208,454 also describes a process for coating porous ceramic catalyst carriers. The lower end faces of the catalyst carriers to be coated are placed on the opening of a collection vessel in which the pressure is reduced to 5 to 16 inches of water below atmospheric pressure by means of a large volume fan. This reduced pressure is held constant during the entire coating period. A predetermined volume of coating dispersion is distributed over the upper end face of the catalyst carrier and drawn uniformly through the flow channels into the collection vessel. The suction process is maintained for at least about 30 seconds. After the first 5seconds the entire amount of coating has been drawn through the catalyst carrier. During the remainder of the time the air flowing through the flow channels ensures that any flow channels blocked by coating dispersion are cleared. The amount of coating remaining on the catalyst carrier can be affected by the duration of the total suction time and by the extent to which the pressure is reduced. Axial uniformity of the coating on the catalyst carrier can be improved by turning the catalyst carrier over after about half the suction time and applying the suction in the reverse direction. Using this process, coating dispersions with 30 to 45% solids contents and a viscosity between 60 and 3000 cps can be processed. The preferred solids content is 37 wt % and the preferred viscosity is 400 cps. The reproducibility for the amount of coating applied using this process is given as ±5%.

EP 0 157 651 B1 also describes a process for coating ceramic catalyst carriers with a predetermined amount of a coating dispersion. Here, the pre-weighed amount of coating dispersion is placed in an open, wide, vessel and the lower end face of the catalyst carrier is immersed in the dispersion. Then the dispersion is drawn into the flow channels of the catalyst carrier under suction, by applying a pressure which is slightly below atmospheric to the upper end face. To improve axial uniformity of the coating, it is also recommended here that the coating process be allowed to proceed in two steps.

In the first step, only about 50 to 85% of the total amount of coating is placed in the vessel and drawn into the catalyst carrier under suction. Afterwards, the catalyst carrier is turned over and the remainder of the coating is drawn into the catalyst carrier under suction in the reverse direction. This coating process does not require a separate step for clearing any blocked flow channels. The cycle time for this process is somewhat less than 1 minute. Using this process, coating dispersions which have a solids content between 35 and 52% and viscosities between 15 and 300 cps can be processed.

U.S. Pat. No. 5,182,140 describes a process for coating ceramic and metallic catalyst carriers. In this case, the coating dispersion is pumped from below into the vertically arranged catalyst carrier until the dispersion reaches a height which s well above the upper end face of the catalyst carrier. Then excess coating dispersion is removed from the carrier applying compressed air to the upper end face of the catalyst carrier. This simultaneously blows out any flow channels which are still blocked. In accordance with example 1 in this patent document, the coating dispersion is adjusted to reach an ultimate height of 2 cm above the upper end face of the catalyst carrier. The compressed air for blowing out excess coating dispersion from the flow channels is supplied in two consecutive pressure stages. During the first 2 seconds after filling the catalyst carrier, the coating dispersion is subjected to compressed air at 3.7 bar. This high, pressure means that excess coating dispersion is completely blown out of the flow channels during the available 2 seconds. Then the pressure of the compressed air is reduced to 0.37 bar and the catalyst carrier is subjected to this pressure twice, for 0.5 seconds each time. With this process, coating dispersions which have a specific density between 1 and 2 g/ml and a viscosity between 100 and 500 cps can be processed.

DE 40 40 150 C2 also describes a process for uniformly coating a honeycomb carrier made of ceramic or metal. Here, the honeycomb carrier is introduced into an immersion chamber and filled from below with coating dispersion. Then the honeycomb carrier is emptied by blowing or by suction. The honeycomb carrier is then taken out of the immersion chamber and excess dispersion is removed by suction or by blowing, in order to avoid blocked flow channels, in a separate unit. Using this process, coating dispersions with solids contents between 48 and 64 wt. % and viscosities between 50 and more than 100 cps can be processed.

The processes described are suitable for the coating of both ceramic and metallic carriers. In the case of metallic carriers consisting of stacks of metal strips, DE 4233404 C2, WO 92/14549, and EP 0775808 A1 disclose that the metal strips are coated in a strip coating unit before being assembled into the carrier, as an alternative to coating the final carrier.

The treatment of exhaust gases from internal combustion engines is subject to increasingly stringent Federal and State legal requirements with regard to conversion of the harmful substances. In order to comply with these requirements, catalyst carriers with higher and higher cell densities are being developed. The greater number of catalyst carriers produced, however, still has cell densities of only 62 $cm^{-2}$. A small number of carriers with cell densities of 124 $cm^{-2}$ has been manufactured. These are mainly carriers made from metal strips.

Carriers with cell densities of more than 186 $cm^{-2}$ are under development. In addition, attempts have been made to improve the conversion of harmful substances using so-called start catalysts which are incorporated into the exhaust gas pipe close to the engine, upstream of the actual main catalyst. These are small volume catalysts which may also have high cell densities. These catalysts can also be used to advantage for treating exhaust gases from motor cycles.

The coating processes described for catalyst carriers are suitable to only a limited extent for the coating of small volume catalyst carriers. This is true in particular in the case of small volume catalyst carriers with high cell densities. The cycle rates which can be produced with known processes are too small for an economically viable coating process. Only large carriers with low cell densities can be coated effectively using these processes. Monitoring the viscosities of coating dispersions is sometimes costly because the coating dispersion loses a considerable proportion of its moisture content due to prolonged contact with the air streams used to clear the flow channels and this has to be continuously topped up in order to be able to ensure reproducibility of the coating.

The production of small volume catalysts from previously coated metal strips, on the other hand, leads to losses of active coating material due to blockage of the flow channels when assembling the catalysts. These losses may amount to up to 10% in unfavourable cases. In addition, it is a characteristic of this mode of operation that acute-angled cavities are formed at the contact points between neighbouring metal strips and this has an unfavourable effect on the access of exhaust gases to the catalytic coating and thus reduces the catalytic activity of the catalyst.

Therefore, an object of the present invention is to be able to coat honeycomb-shaped ceramic and metallic catalysts in a cycle time of less than 10 seconds and to enable the reproducible coating of carriers with a cell density of more than 180 $cm^{-2}$.

SUMMARY OF THE INVENTION

The above and other objects of the invention can be achieved by a process for coating the flow channels in a monolithic, cylindrically shaped, catalyst carrier with a coating dispersion, wherein the carrier has two end faces which are connected to each other via flow channels arranged parallel to the axis of the cylinder. Coating is performed by vertically aligning the axis of the cylindrical carrier, placing a predetermined amount of coating dispersion from a storage container on the upper end face of the carrier and drawing the dispersion through the flow channels under suction, removing excess coating dispersion from the flow channels by emptying the flow channels under suction, returning the excess dispersion to the storage container and fixing the dispersion coating by calcination.

The process is characterised in that the coating dispersion is drawn through the flow channels under suction at a rate of flow of 0.1 to 1 m/s (meters per second) and that after completion of passage under suction the excess coating dispersion is removed from the flow channels by applying a suction impulse from below, wherein the suction air is drawn through the flow channels under suction at a rate of flow between 40 and 1 m/s and the excess coating dispersion discharged with the air stream is separated from the air stream within a time of less than 100 ms after discharge from the catalyst carrier.

According to the invention, therefore, coating of the flow channels is performed in two stages. In the first stage, a predetermined amount of coating dispersion is placed on the upper end face of the catalyst carrier and drawn through the flow channels under suction at a rate of flow 0.1 to 1 m/s by applying a pressure which is lower than atmospheric to the lower end face. The predetermined amount of coating dispersion is preferably such that it corresponds to 0.5 to 2 times the free volume of the flow channels. The rate of flow is advantageously chosen so that the drawing through under suction process is complete after less than one second.

The second stage follows immediately after this first stage and in this stage the flow channels are cleared of excess coating dispersion by applying a suction impulse. Here, a suction impulse is understood to be a process in which initially a very large amount of air is conveyed through the flow channels. During the course of the suction impulse, however, the amount being conveyed decreases continuously.

This type of suction impulse can be achieved by connecting the lower end face of the carrier to a large container at a pressure which is less than atmospheric, which results in the initial rate of flow of suction air in the flow channels being very high and then decreasing continuously during the course of the suction process since the difference between the pressure in the reduced pressure container and atmospheric pressure is continuously reduced by the suction air being conveyed thereto. According to the invention, the initial rate of flow of the suction air should be between 5 and 40 m/s. At the end of the suction process the rate of flow is reduced to the minimum rate of about 1 m/s.

During the first stage of the process the lower end face of the catalyst carrier is also connected to the reduced pressure container in order to draw the coating dispersion through the flow channels under suction. However, a suitable flow restrict or has to be used to ensure that the rates of flow according to the invention of coating dispersion are maintained in the flow channels.

An essential aspect of the invention is the early separation from the suction air of the excess coating dispersion discharged from the flow channels with the suction air. This reduces the extraction of liquid from the coating dispersion and simplifies recycling of the excess coating dispersion to the storage container. Without this measure, the solids content of the coating dispersion in the storage container would constantly increase and thus make reproducible coating of the catalyst carriers difficult.

BRIEF DESCRIPTION OF DRAWINGS

The present invention will be further understood with reference to the accompanying drawings, wherein:

FIG. 1 is a schematic representation of a device for performing the process according to the invention, and FIG. 2 is a schematic diagram illustrating filling the acute-angled cavities in a metallic catalyst carrier by precoating.

DETAILED DESCRIPTION OF THE INVENTION

The device shown schematically in FIG. 1 is suitable for performing the process according to the invention. (1) denotes the carrier to be coated. Storage container (3) with coating dispersion (4) is arranged above the carrier. The storage container has a lower opening (5) for filling the follow channels in the carrier with coating dispersion. The cross-section of opening (5) matches the cross-sectional shape of the carrier to be coated, but is slightly smaller than the cross-section of the catalyst carrier in order to enable application of the edge of the catalyst carrier onto seal 2 and thus prevent the discharge of coating dispersion between the storage container and the carrier during the filling process. The storage container is provided with a filling valve (6) to place the predetermined amount of coating dispersion on the upper end face of the carrier.

The lower end face of the carrier sits on the edge of opening (8) in cover plate (9) of suction chamber (7). Opening (8) also has the same cross-sectional shape as the carrier but is slightly smaller than the cross-section of the carrier in order to seal the outer edge of the carrier with the aid of seal (2'). A collection vessel (10) is located inside suction chamber (7), below opening (8), to trap excess coating dispersion. The upper edge of the collection vessel is labelled (11). The base of collection vessel (10) is provided with an emptying valve (12). By opening the valve, excess coating dispersion (4') being collected in the collection vessel can be pumped back into storage container (3) through pipe (13) from time to time, using pump (14).

Suction chamber (7) is connected to a reduced pressure container (18) via a pipe (16) with a large cross-section. The connection may be made or broken using suction valve (17). In addition, the suction chamber is connected to the reduced pressure container (18) via another pipe (20) and a flow control valve (21). The reduced pressure container (18) is evacuated via fan (19) down to a pressure between 100 and 850 mbar absolute. The volume of the reduced pressure container is about 500 to 1000 times the volume of the catalyst carrier to be coated.

The storage container (3) in FIG. 1 can be displaced in the vertical direction. To fill the flow channels with coating dispersion, the storage container is lowered so that seal 2 is on the upper edge of the catalyst carrier. A tight connection is made between the two. After completing the filling process, filling valve (6) is closed again and the storage container is raised. In order to enable this motion, return pipe (13) in FIG. 1 is provided with a moveable sleeve (15). As an alternative, a flexible hose connection may also be provided for this purpose.

The seals (2) and (2') may be, for example, inflatable rubber collars into which the carrier is inserted. A tight seal is formed between the collar and the outer surface of the carrier by inflating the rubber collars.

An alternative embodiment of the seals in the form of flat gaskets is shown in FIG. 1. This embodiment is particularly suitable for carriers in which the outer surface projects beyond the actual end face of the catalyst carrier, in the form of a raised edge. In this case the seal can easily be formed by pressing the edges of the catalyst carrier onto the flat gaskets.

The coating process according to the invention is particularly suitable for small volume catalysts with high cell densities, above 180 $cm^{-2}$, and with lengths of up to 10 cm and diameters of less than 10 cm. The coating process proceeds via the following steps:

1. close suction valve (17),
2. place the carrier on seal (2') of the suction chamber and lower the storage container, with its seal (2), onto the upper edge of the carrier,
3. open filling valve (6) for a time interval of less than one second and flood the upper end face of carrier (1) with a predetermined amount of coating dispersion (in the following also called the filling amount),
4. draw the coating dispersion under suction through the flow channels of the carrier during the time the filling valve is open at a rate of flow between 0.1 and 1 m/s, wherein the reduced pressure required to achieve this is provided at the lower end face of the carrier, via flow control valve (21),
5. close filling valve (6) and separate the connection between carrier and storage container in order to enable free access for air to the upper end face of the carrier,
6. apply a suction impulse to the lower end face of the carrier by opening suction valve (17) in order to remove excess coating dispersion from the flow channels as a result of drawing an amount of air through which corresponds to 100 to 1000 times the free volume of the flow channels with a decreasing rate of flow of between 40 and 1 m/s,
7. close the suction valve and remove the coated carrier; dry and calcine the coating in a drying oven,
8. periodically open the emptying valve (12) to return the coating dispersion (4') collecting in the collection vessel to storage container (3), using pump (14).

Thus, according to the invention, the carrier to be coated is first filled by drawing coating dispersion into the flow channels under suction. The amount of coating dispersion used for this purpose (filling amount) is advantageously between one half and double the free volume of the flow channels. Drawing through under suction is performed with a rate of flow of coating dispersion in the flow channels between 0.1 and 1 m/s. The opening time required for the filling valve can easily be calculated from the filling amount, the length of the catalyst carrier and the rate of flow. It is less than one second.

The rate of flow required can be adjusted by the pressure in the reduced pressure container and the extent to which the flow control valve (21) is opened. The flow control valve advantageously remains open during the entire coating procedure.

After closing the filling valve, the connection between the storage container and the catalyst carrier is broken, for example by raising the storage container, and thus creates easy access for air to the upper end face of the catalyst carrier. At the same time, suction valve (17) is opened, which creates a large cross-section connection to the reduced pressure container. This applies a suction impulse at the lower end face of the catalyst carrier which means that the excess coating dispersion is removed from the flow channels and any blocked flow channels are cleared. The size of the suction impulse depends on the pressure in the reduced pressure container. The pressure should be a maximum of 850 mbar absolute in order to produce an adequate suction impulse with initial rates of flow of air in the flow channels of 5 to 40 m/s.

Good coating results are obtained, according to experience, with a suction impulse during which 100 to 1000 times the free volume of the flow channels is drawn through the catalyst carrier within a time of generally much less than 5 seconds. During this time, the rate of flow decreases, due to the increasing pressure in the reduced pressure container, from its initial maximum value to a minimum of about 1 to 5 m/s.

After the excess coating dispersion has been drawn out under suction, the catalyst carrier can be removed from the coating device and dried and calcined in an oven.

The entire, coating process, from inserting the catalyst carrier in the coating device to removing it therefrom is completed in less than 10 seconds.

An essential feature of the process according to the invention is, in addition to applying the suction impulse, the early separation of the excess dispersion coating from the air stream used to clear the catalyst carrier. According to the invention, the time between discharge of the coating dispersion from: the lower end face of the catalyst carrier and its separation from the air stream is no more than 100 ms, preferably less than 10 ms. This is achieved in the coating device according to FIG. 1 which has been described by locating a collection vessel (10) in the suction chamber in such a way that its upper edge (11) reaches to within less than 5 cm of the lower end face of the catalyst carrier.

The suction impulse is thus substantially applied to the lower end face of the catalyst carrier via the annular gap between the upper edge (11) of the collection vessel and cover plate (9) of the suction chamber. After passing through the catalyst carrier, the air stream experiences a change in direction of about 90°. The droplets of coating dispersion drawn out under suction do not follow this bend, due to their inertia, but are collected at the bottom of the collection vessel. The liquid surface of the dispersion collected in the collection vessel is no longer in contact with the air stream due to this physical layout of suction chamber and collection vessel.

The air stream cannot therefore concentrate the excess coating dispersion by extracting moisture, as is the case, for example; with the arrangement in accordance with U.S. No. 4,208,454. There, the liquid surface of the excess coating dispersion is subjected to the air stream during the entire suction time of 30 seconds, which leads to a high liquid loss and thus to the need to process the excess coating dispersion before it can be returned to the storage container.

This processing procedure may be omitted in the process according to the invention without having any effect on the reproducibility of the coatings.

Figure 2:
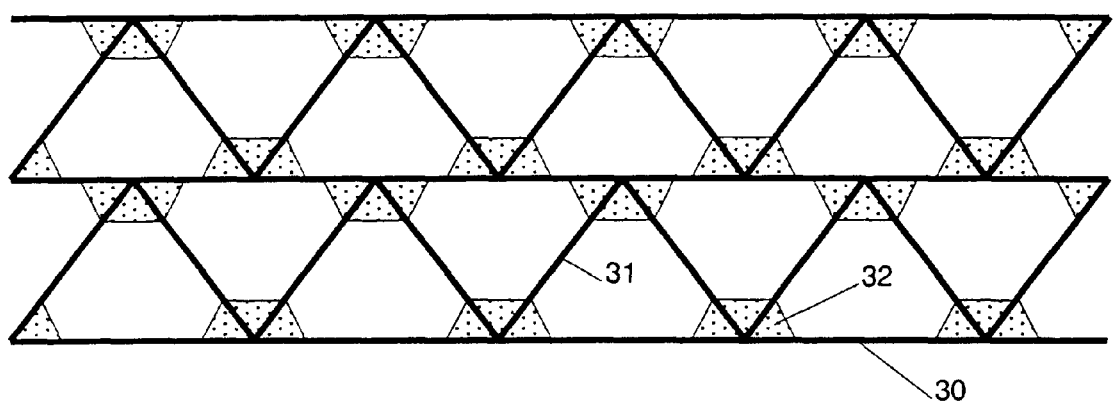

The acute-angled cavities at the contact points of metal strips, as is shown in FIG. 2, can be filled by pre-coating carriers made of metal strips with a low viscosity dispersion or solution which contains no noble metals and which has a high surface tension and then drying. The diffusion pathway for harmful substance conversion is shortened when subsequently coating with a dispersion in which the catalytically active noble metal is fixed on the solids in the dispersion. This means that expensive noble metal is saved and also that the catalytic activity of the catalyst is increased.

FIG. 2 shows, schematically, a section through a catalyst carrier made of superimposed, alternating smooth (30) and corrugated (31) metal strips. The acute-angled regions at the contact points of corrugated and smooth metal strips can be filled with a dispersion (32) which does not contain a noble metal in a pre-coating procedure.

Further variations and modifications of the foregoing will be apparent to those skilled in the art and are intended to be encompassed by the claims appended hereto.

German priority application 198 37 732.1 filed Aug. 20, 1998 is relied on.

We claim:
1. A process for coating the flow channels in a monolithic, cylindrically shaped catalyst carrier with a coating dispersion, wherein the carrier has two end faces which are connected to each other by flow channels arranged parallel to the axis of the cylinder, comprising
vertically aligning the axis of the cylindrical carrier, placing a predetermined amount of coating dispersion on the upper end face of the carrier and drawing the dispersion through the flow channels under suction, removing excess coating dispersion from the flow channels by emptying the flow channels under suction, and fixing the dispersion coating by calcination, wherein the coating dispersion is drawn through the flow channels under suction at a rate of flow of 0.1 to 1 m/s and that after completion of passage under suction the excess coating dispersion is removed from the flow channels by applying a suction impulse from below, wherein the suction air is drawn through the flow channels under suction at a decreasing rate of flow that begins at a rate of greater than 5 m/s and up to 40 m/s and ends at a lower rate between 40 m/s and 1 m/s and the excess coating dispersion discharged with the air stream is separated from the air stream within a time of less than 100 ms after discharge from the catalyst carrier and the excess coating dispersion is collected in a collection vessel that is not in contact with the air stream.

2. The process according to claim 1, further comprising recycling excess dispersion to a storage facility.

3. The process according to claim 1 wherein the, predetermined amount of coating dispersion amounts to 0.5 to 2 times the free volume of the flow channels.

4. The process according to claim 3, wherein the amount of air to clear the flow channels corresponds to 100 to 1000times the free volume of the flow channels.

5. The process according to claim 1, wherein the coating dispersion contains at least one catalytically active noble metal.

6. The process according to claim 5, further comprising before applying dispersion which contains the noble metal, pre-coating the carrier with a coating which does not contain a noble metal.

7. A process for coating the flow channels in a monolithic, cylindrically shaped catalyst carrier with a coating dispersion, wherein the carrier has a cell density, expressed as the number of flow channels per unit area of the cross section of the catalyst carrier, of more than 180 $cm^{-2}$ and two end faces which are connected to each other by flow channels arranged parallel to the axis of the cylinder, comprising vertically aligning the axis of the cylindrical carrier, placing a predetermined amount of coating dispersion on the upper end face of the carrier, drawing the dispersion through the flow channels under suction, at a rate of flow of 0.1 to 1 mis, after completion of passage under suction, removing the excess coating dispersion from the flow channels by applying a suction impulse from below to draw air through the flow channels under suction at a decreasing rate of flow that begins at a rate of greater than 5 m/s and up to 40 m/s and ends at a lower rate of between 40 m/s and 1 m/s and discharging the excess coating dispersion with the air stream and separating the excess coating from the air stream within a time of less than 100 ms after discharge from the catalyst carrier, wherein the excess coating dispersion is collected in a collection vessel that is not in contact with the air stream, and thereafter fixing the dispersion by calcining.

8. The process according to claim 7, further comprising wherein cycle time of the process is less than 10 seconds.

9. The process according to claim 9, wherein the predetermined amount of coating dispersion amounts to 0.5 to 2 times the free volume of the flow channels.

10. The process according to claim 9, wherein the amount of air to clear the flow channels corresponds to 100 to 1000 times the free volume of the flow channels.

11. The process according to claim 7, wherein the coating dispersion contains at least one catalytically active noble metal.

12. A process for coating the flow channels in a monolithic, cylindrically shaped catalyst carrier with a coating dispersion, wherein the carrier has a cell density, expressed as the number of flow channels per unit area of the cross section of the catalyst carrier, of more than 180 $cm^{-2}$ and two end faces which are connected to each other by flow channels arranged parallel to the axis of the cylinder, comprising in a first stage vertically aligning the axis of the cylindrical carrier, placing a predetermined amount of coating dispersion on the upper end face of the carrier, drawing the dispersion through the flow channels under suction at a rate of flow of 0.1 to 1 m/s, by applying pressure which is lower than atmosphere to the lower end face of said carrier, and in a second stage immediately after completion of passage under suction removing the excess coating dispersion from the flow channels by applying a suction impulse from below, wherein the suction air is drawn through the flow channels under suction at an initially high rate of flow between 5 and 40 m/s and ending the suction process at a rate of flow to about 1 to 5 m/s and discharging excess coating dispersion with the air stream and separating said dispersion from the air stream within a time of less than 100 ms after discharge from the catalyst carrier to thereby reduce extraction of liquid from the coating dispersion to control solids content of said dispersion, wherein the excess coating dispersion is collected in a collection vessel and is not in contact with the air stream.

13. The process according to claim 12, wherein the predetermined amount of coating dispersion amounts to 0.5 to 2 times the free volume of the flow channels.

14. The process according to claim 13, wherein the amount of air to clear the flow channels corresponds to 100 to 1000 times the free volume of the flow channels.

15. The process according to claim 12, wherein the coating dispersion contains at least one catalytically active noble metal.

16. The process according to claim 12, wherein the carrier has a diameter of less than 10 cm and a length up to 10 cm.

17. The process according to claim 12, wherein the process is completed in less than 10 seconds.

18. A process for coating the flow channels in a monolithic, cylindrically shaped catalyst carrier having a cell density, expressed as the number of flow channels per unit area of the cross section of the catalyst carrier, of more than 180 $cm^{-2}$ comprising placing the carrier to be coated on a seal of a suction chamber, lowering a storage container so that a seal is in contact with the upper edge of the catalyst carrier, introducing a predetermined amount of coating dispersion for a time interval of less than 1 second to flood the upper end face of said carrier with the predetermined amount of coating dispersion, wherein the coating dispersion contains water drawing the coating dispersion under suction through the channels of the carrier during the time the coating dispersion is introduced at a rate of flow between 0.1 and 1 m/s wherein the reduced pressure required to achieve this is provided at the lower end face of the carrier, separating the carrier and the storage container in order to enable free access of air to the upper end face of the carrier, applying a suction impulse to the lower end face of the carrier in order to remove excess coating dispersion from the flow channels as a result of drawing an amount of air through which corresponds to 100 to 1000 times the free volume of the flow channels with the decreasing flow rate of between 40 and 1 meter per second, changing direction of the air away from excess coating dispersion within a time period of less than 100 ms of being removed from said flow channels so as to avoid extraction of moisture from said coating dispersion, wherein the excess coating dispersion is collected in a collection vessel and is not in contact with the air stream, and removing the coated carrier, drying and calcining the coating.

19. The process according to claim 18, wherein the predetermined amount of coating dispersion amounts to 0.5 to 2 times the free volume of the flow channels.

* * * * *